US008948767B2

(12) United States Patent
Sridhar et al.

(10) Patent No.: US 8,948,767 B2
(45) Date of Patent: Feb. 3, 2015

(54) METHOD AND APPARATUS FOR DYNAMICALLY MODIFYING CELL RESELECTION AND/OR HANDOVER PARAMETERS

(75) Inventors: Kamakshi Sridhar, Plano, TX (US); Frank Favichia, Sparta, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/357,849

(22) Filed: Jan. 25, 2012

(65) Prior Publication Data

US 2013/0189996 A1    Jul. 25, 2013

(51) Int. Cl.
*H04W 36/00*    (2009.01)

(52) U.S. Cl.
USPC .......................... 455/444; 455/436; 455/437

(58) Field of Classification Search
CPC ..... H04W 36/06; H04W 36/14; H04W 36/16; H04W 36/26; H04W 28/18; H04W 72/04; H04W 84/045; H04W 88/06
USPC ................. 455/423, 436, 437, 444, 458, 525; 370/332
See application file for complete search history.

(56) References Cited

U.S. PATENT DOCUMENTS

| | | | | |
|---|---|---|---|---|
| 2005/0037798 | A1* | 2/2005 | Yamashita et al. ............ | 455/525 |
| 2008/0220782 | A1* | 9/2008 | Wang et al. ................... | 455/436 |
| 2009/0047954 | A1* | 2/2009 | Tenny et al. ............... | 455/435.3 |
| 2009/0117905 | A1* | 5/2009 | Watanabe et al. ............. | 455/437 |
| 2009/0170510 | A1* | 7/2009 | Kim .............................. | 455/434 |
| 2010/0111013 | A1* | 5/2010 | Chou ............................. | 370/329 |
| 2010/0173652 | A1* | 7/2010 | Nigam et al. .................. | 455/458 |
| 2010/0184439 | A1* | 7/2010 | Chen et al. .................... | 455/436 |
| 2010/0208707 | A1* | 8/2010 | Hamabe et al. ............... | 370/332 |
| 2010/0232318 | A1* | 9/2010 | Sarkar .......................... | 370/254 |
| 2010/0325267 | A1* | 12/2010 | Mishra et al. ................. | 709/224 |
| 2011/0028144 | A1* | 2/2011 | Catovic et al. ................ | 455/423 |
| 2011/0124341 | A1* | 5/2011 | Kubo et al. ................... | 455/440 |
| 2011/0263256 | A1* | 10/2011 | Yavuz et al. .................. | 455/436 |
| 2011/0263260 | A1* | 10/2011 | Yavuz et al. .................. | 455/437 |
| 2012/0002557 | A1* | 1/2012 | Sedlar et al. .................. | 370/252 |
| 2012/0039305 | A1* | 2/2012 | Han et al. ..................... | 370/332 |
| 2012/0135739 | A1* | 5/2012 | Paterson ....................... | 455/436 |
| 2012/0322447 | A1* | 12/2012 | Ramachandran et al. .... | 455/436 |

OTHER PUBLICATIONS

TR-069 Amendment 3, CPE WAN Management Protocol *Broadband Forum Technical Report*, CPE WAN Management Protocol, Issue: 1; Issue Date: Nov. 2010 Protocol Version: 1-2.

(Continued)

*Primary Examiner* — Nathan Taylor
(74) *Attorney, Agent, or Firm* — Davidson Sheehan, LLP

(57) ABSTRACT

Embodiments of the claimed subject matter provide embodiments of a method and apparatus for dynamically modifying cell reselection parameters and/or handover parameters. One embodiment of the method includes providing a request for a cell reselection parameter or handover parameter in response to a small cell determining that a number of cell reselections or a number of handovers between the small cell and at least one macrocell exceeds at least one threshold. In this embodiment, the cell reselection parameter or handover parameter is stored in the small cell.

31 Claims, 5 Drawing Sheets

(56) References Cited

OTHER PUBLICATIONS

Alcatel-Lucent 5620 SAM, Service Aware Manager, Release 7.0 (2009).

"3GPP TS 36.423 v10.4.0", 3rd Generation Partnership Project; Technical Specification Group Radio Access Network; Evolved Universal Terrestrial Radio Access Network (E-UTRAN); X2 Application Protocol (X2AP) (Release 10), Dec. 20, 2011, pp. 27 and 43-44, 4 pages.

* cited by examiner

METHOD AND APPARATUS FOR DYNAMICALLY MODIFYING CELL RESELECTION AND/OR HANDOVER PARAMETERS

CROSS REFERENCE TO RELATED APPLICATIONS

This application is related to U.S. patent application Ser. No. 13/212897, filed on Aug. 18, 2011.

BACKGROUND

This application relates generally to communication systems, and, more particularly, to wireless communication systems.

Wireless communication systems typically deploy numerous access points (or other types of devices for providing wireless connectivity such as base station transceivers) for providing wireless connectivity to access terminals (or other types of user equipment, mobile units, or wireless-enabled devices). Each access point is responsible for providing wireless connectivity to the mobile units located in a particular cell or sector served by the access point. In some cases, the mobile units may initiate wireless communication with one or more access points in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central set of network elements in a wireless network. The core network elements may then transmit paging messages to the target mobile unit via one or more access points. The target mobile unit may establish a wireless link to one or more of the access points in response to receiving the page from the wireless communication system. A radio resource management function within the Radio Access Network (RAN) and wireless core network receives the voice and/or data and coordinates the radio resources and time resources used by the set of access points to transmit the information to the target mobile unit.

One alternative to the conventional hierarchical network architecture is a distributed architecture including a network of access points, such as a base transceiver station (BTS) that implements distributed communication network functionality. For example, each base transceiver station may combine core network functions in a single entity that manages radio links between one or more mobile units and an outside network, such as the Internet. The base transceiver stations wholly encapsulate the cellular access technology and may proxy functionality that utilizes core network element support to equivalent IP functions. For example, IP anchoring in a UMTS base transceiver station may be offered through a Mobile IP Home Agent (HA) and the GGSN anchoring functions that the base transceiver station proxies by through equivalent Mobile IP signaling. Compared to hierarchical networks, distributed architectures have the potential to reduce the cost and/or complexity of deploying the network, as well as the cost and/or complexity of adding additional wireless access points to expand or enhance the coverage of an existing network. Distributed networks may also reduce (relative to hierarchical networks) the delays experienced by users because packet queuing delays at the wireless core of hierarchical networks, e.g. delays at the RNC in a UMTS network or at the packet data serving node (PDSN) of a CDMA network, may be reduced or removed.

At least in part because of the reduced cost and complexity of deploying a base transceiver station, these devices may be deployed in locations that are impractical for conventional base stations. For example, small cells that provide a smaller coverage area can be deployed in conjunction with (and often event overlay configuration with) a macrocell that provides a relatively larger coverage area. Small cells may be deployed in a residence or building to provide wireless connectivity to the occupants of the residents of the building. Small cells deployed in a residence are typically referred to as home base station routers or femtocells because they are intended to provide wireless connectivity to a smaller coverage area or cell that encompasses a residence. Base transceiver stations deployed for public or semi-private use may also be referred to as metro cells. However, the functionality in the different types of small cells is typically quite similar to the functionality implemented in a conventional macrocellular base transceiver station that is intended to provide wireless connectivity to a macro-cell that may cover an area of approximately a few square kilometers. One important difference between a femtocell and a conventional base transceiver station is that femtocells are designed to be plug-and-play devices that can be purchased off-the-shelf and easily installed by a lay person. Deployment of femtocells and/or metro cells may result in a very large number of cells that overlap, overlay, and/or are encompassed by one or more macro-cells.

Active mobile units may be handed off from one base station to another as the mobile units wander throughout the wireless communication system. Mobile units may also be handed off from a macro cellular base station to a home base station router or femtocell, even when the coverage area of the base station completely encompasses the coverage area of the femtocell. For example, a user's mobile unit may hand off to a home base station router when the user enters the radio environment of the femtocell and the signal strength achieves a specific quality threshold. From the point of view of the user, robust handover techniques are critical for supporting seamless service as the mobile unit wanders. Users quickly become frustrated by gaps or silences in voice communication that may be caused by latency in the handover process. Some users may even switch providers if calls are frequently dropped when the user wanders from one cell to another. Idle mobile units may autonomously select a new cell and perform a cell reselection process to camp on the new cell.

The basic condition for initiating a handover or cell reselection is that the signal strength from the candidate target base station or cell is stronger/better than the signal strength from the current serving base station or cell. However, simply handing off a mobile unit as soon as the target base station appears to have a stronger signal than the serving base station can lead to a number of problems. For example, the signal strengths near the boundaries between a serving cell and its neighbor cells are (almost by definition) nearly equal. Furthermore, the relative values of the signal strengths may be subject to rapid fluctuations when both signals are close to the threshold. The signal strength received by each mobile unit near a boundary is therefore approximately equal and relatively small deviations can cause the relative signal strengths to flip-flop. The strength of the signals received by a particular mobile unit may also vary rapidly due to movement of the mobile unit and/or environmental changes. Consequently, the mobile unit may be rapidly handed back and forth (a phenomenon known as ping-ponging or hysteria) if the hand off is performed based only on the relative signal strength. Ping-ponging consumes valuable overhead unnecessarily, degrades the perceived call quality, and can even lead to dropped calls.

Handovers and/or cell reselection can be made more robust by using a more sophisticated handoff condition. For example, conventional handovers are performed when the signal strength from the candidate cell is better than the signal strengths from the current serving cell by a certain amount determined by a hysteresis value and offset (or bias) values. Each cell uses a single value of the hysteresis, e.g., 2 dB. Each cell also maintains different values for the offset that are applied to handoffs between the cell and its neighbor cells. For example, the offset value for handoffs between a serving cell and a first neighbor cell may be 1 dB and the offset value for handoffs between the serving cell and a second neighbor cell may be 2 dB. A time-to-trigger (TTT) is used to delay the hand off until the "better" conditions on the target cell persist for at least the TTT duration. In 3G technologies, the hysteresis, offset values, and TTT are set to one golden set that is applied to all cells. The golden set is selected for convenience alone and does not provide performance benefits.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for dynamically modifying cell reselection parameters and/or handover parameters. One embodiment of the method includes providing a request for a cell reselection parameter or handover parameter in response to a small cell determining that a number of cell reselections or a number of handovers between the small cell and at least one macrocell exceeds at least one threshold. In this embodiment, the cell reselection parameter or handover parameter is stored in the small cell.

In another embodiment, a method is provided for dynamically modifying cell reselection parameters and/or handover parameters. This embodiment includes receiving a first request for a cell reselection parameter or handover parameter in response to a small cell determining that a number of cell reselections or a number of handovers between the small cell and at least one macrocell exceeds at least one threshold. This embodiment also includes providing the cell reselection parameter or handover parameter to the small cell.

In yet another embodiment, a method is provided for dynamically modifying cell reselection parameters and/or handover parameters. This embodiment includes receiving a request for a cell reselection parameter or handover parameter in response to a small cell determining that a number of cell reselections or a number of handovers between the small cell and at least one macrocell exceeds at least one threshold. This embodiment also includes providing the cell reselection parameter or handover parameter for transmission from a first server to the small cell.

In yet another embodiment, a small cell is provided for dynamically modifying cell reselection parameters and/or handover parameters. One embodiment of the small cell includes at least one counter for counting a number of cell reselections or a number of handovers between the small cell and at least one macrocell. This embodiment of the small cell also includes a comparator for determining whether the number of cell reselections or the number of handovers exceeds at least one threshold.

In yet another embodiment, a management server is provided for dynamically modifying cell reselection parameters and/or handover parameters. One embodiment of the management server includes a database for storing information indicating a number of cell reselections or a number of handovers between a small cell and at least one macrocell. The information is received from the small cell in response to the number of cell reselections or the number of handovers between the small cell and at least one macrocell exceeding at least one threshold. This embodiment of the management server also includes a processing element configured to generate a request to modify a cell reselection parameter or handover parameter used by the small cell. The request is generated based on the information stored in the database.

In yet another embodiment, a network server is provided for dynamically modifying cell reselection parameters and/or handover parameters. One embodiment of the network server includes a processing element configured to a cell reselection parameter or handover parameter in response to a small cell determining that a number of cell reselections or a number of handovers between the small cell and at least one macrocell exceeds at least one threshold.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
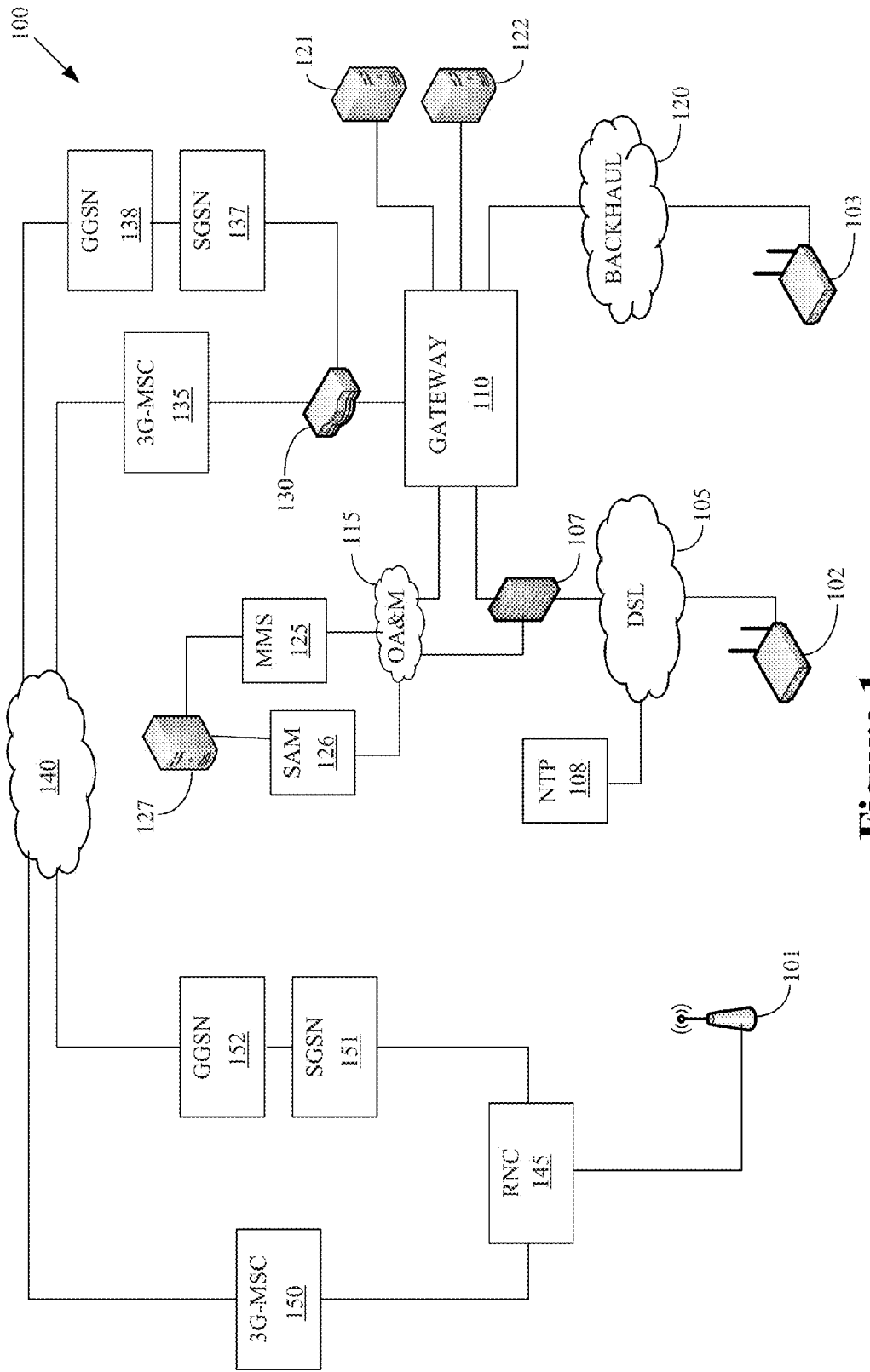
FIG. 1 conceptually illustrates a first exemplary embodiment of a wireless communication system that supports overlaying macrocellular and microcellular wireless coverage.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The volume of data transmitted through wireless communication networks has increased dramatically and created a need to add additional wireless capacity in hotspots. Operators, such as AT&T, are looking to add small cells (which may include femtocells, metro cells, home node Bs, HNBs, or HeNBs) to help relieve the congestion experienced at the macro cell layer. For example, low mobility users can be offloaded to the small cells. A heterogeneous UMTS network may therefore include macrocells and small cells such as metro cells and/or femtocells that provide wireless coverage in overlapping coverage areas. The macrocells and small cells may be interconnected using various interfaces, which may be defined by relevant standards and/or protocols. The small cells may be connected to a gateway such as a FemtoGW, which connects to the mobile switching center (MSC) via an Iu-CS interface or the serving GPRS serving node (SGSN) via the Iu-PS interface. In various embodiments, the metro cells could be put on the same carrier as the femtocells or could be on a separate carrier. Exemplary femtocells and metro cells may be managed by TR-069 based management systems such as the system described in the Broadband Form Technical Report TR-069 Amendment 3: CPE WAN Management Protocol.

Macrocells and small cells such as femtocells/metro cells do not necessarily share the same addressing or identifying scheme in all deployments. Consequently, location areas and/or routing areas associated with the macrocell and the small cells may cover different geographical areas. Ping-ponging of active and/or idle access terminals between macrocells and small cells may therefore generate significant overhead because each handoff of an active access terminal or cell reselection by an idle access terminal generates a location area update and/or a routing area update. Conventional wireless communication systems use preconfigured idle mode cell reselection parameters and active mode handoff parameters, which are downloaded to the small cell when the device is initialized. Consequently, conventional systems do not include any mechanism for dynamically responding to ping-ponging between small cells and the overlaying macrocellular system.

The present application therefore describes embodiments of techniques that are used to monitor or count the number of cell reselections and/or handoffs at the small cell. Monitoring can be performed on a per user equipment basis. Monitoring can also be performed separately for idle user equipment and active user equipment. For example, a small cell can maintain counters to count the number of cell reselections for each idle access terminal and to count the number of handoffs for each active access terminal. Information indicating the number of reselections or handoffs can then be fed back to the management system when configurable thresholds are crossed. For example, when the number of reselections and/or handoffs exceeds a threshold value, the small cell can signal a server to re-compute the cell reselection and/or handover parameters. The threshold can be expressed in terms of a number of reselections/handovers and/or a rate of reselections/handovers, e.g. the number within a time interval, an exponentially weighted moving average of the number, and the like. In one embodiment, the management system may coordinate with a self-optimizing network (SON) server to determine a modified set of parameters in response to the feedback. For example, the modified parameters may be selected from a pre-configured set of multiple instances of the different parameters. Alternatively, the modified parameters may be calculated, e.g., by applying empirical relations, theoretical relations, models, or other functions to the feedback information and possibly other information indicating the state of the network or the access terminal. The alternative set of parameters may then be transmitted via existing management interfaces to the small cell. The modified parameters are selected to attempt to optimize the reselection and/or handover parameters to reduce ping-ponging and thereby reduce the corresponding signaling overhead.

FIG. 1 conceptually illustrates a first exemplary embodiment of a wireless communication system 100 that supports overlaying macrocellular and microcellular wireless coverage. In the illustrated embodiment, wireless connectivity is provided by macrocells 101 and small cells such as femtocells 102 and/or metro cells 103. Macrocells 101 may include devices such as access points, base stations, base transceiver stations, base station routers, node Bs (NBs, eNBs), and the like. In addition to femtocells and/or metro cells, small cells may also include devices such as microcells, picocells, home NBs (HNBs, HeNBs), and the like. Persons of ordinary skill in the art having benefit of the present disclosure should also appreciate that the term "cell" may refer to either the device that provides wireless connectivity or the geographical coverage area of the device providing wireless connectivity.

In the interest of clarity, the term "small cell" is used herein to refer collectively to devices that are used to provide wireless connectivity in hotspots that augment, enhance, and/or overlay the coverage and/or capacity provided by the macrocellular wireless communication system. Accordingly, the term "small cell" may refer to femtocells, metro cells, picocells, microcells, HNBs, and the like. Femtocells are defined herein as small cells optimized for indoor applications in residential and/or enterprise environments. In one embodiment, a femtocell may only support a single carrier and a single radio technology. A femtocell may be operated in a "closed subscriber group" (CSG) mode so that the femtocell is only accessible to a nominated list of end users. A metro cell is defined herein as a small cell optimized to offer either indoor or outdoor coverage and/or capacity in public areas and accessible to any end user with access rights. A metro cell may be either designed to support a single carrier and radio technology or multiple radio technologies. Typically, a metro cell that supports multiple radio technologies supports one carrier per technology.

In the illustrated embodiment, the femtocell 102 is communicatively connected to a digital subscriber line (DSL) network 105 that may be connected to a gateway 110 and an operations, administration, and maintenance (OAM) network 115 via a firewall 107. The network 105 may also be connected to a network time protocol (NTP) element 108 that provides access to accurate time and date information. Alternatively, timing may be provided by other systems such as Global Positioning Systems (GPS). The metro cell 103 may also be communicatively connected to a backhaul network 120, which may be communicatively connected to the gateway 110. In the illustrated embodiment, the gateway 110 is a small cell gateway that is communicatively coupled to various network entities such as the OAM network 115 and servers 121, 122 such as a global positioning system (GPS) server for supporting GPS location and/or timing services, a presence server for supporting presence services that indicate when access terminals are present, and the like.

The wireless communication system 100 may also include motive management services (MMS) servers 125 and/or TR69 management system such as service aware managers (SAM) 126. Exemplary MMS servers 125 may include TR-69 Management System servers and exemplary SAM 126 devices may include the Alcatel-Lucent 5620 Service Aware Manager that is used to provide end-to-end network management services. In the illustrated embodiment, the MMS server 125 and/or the SAM 126 may be used to gather handoff and/or cell reselection information from the femtocells 102 and/or the metro cells 103. The MMS server 125 and/or the SAM 126 may also be communicatively connected to one or more self-optimizing network (SON) servers 127. The servers 125, 126 may therefore be used to facilitate communication between the SON server 127 and the femtocells 102 and/or metro cells 103. For example, as discussed herein, the servers 125, 126 may request cell reselection parameters and/or handoff parameters from the server 127 on behalf of the femtocells 102 and/or metro cells 103. The servers 125, 126 may also provide the parameters generated by the server 127 to the femtocells 102 and/or metro cells 103.

The gateway 110 in the wireless communication system 100 is communicatively coupled to a router such as an Internet protocol (IP) router 130 that can be used to route circuit-switched calls to a Third Generation mobile switching center (3G-MSC) 135. Circuit-switched calls can then be routed to external networks 140 via the MSC 135. The router 130 may also be used to route packet-switched calls to the network 140 via nodes such as a SGSN 137 and/or a GGSN 138. In the illustrated embodiment, macrocells 101 are communicatively coupled to network layer functionality such as a radio network controller 145. However, persons of ordinary skill in the art having benefit of the present disclosure should appreciate that in alternative embodiments, the network layer functionality and the macrocells 101 may be incorporated into a single device such as a base transceiver station or eNB. The radio network controller 145 may route circuit-switched calls to the network 140 via a 3G-MSC 150. The radio network controller 145 may also route packet-switched calls to the network 140 via nodes such as a SGSN 151 and/or a GGSN 152. The functionality of the 3G-MSC 135, 150 and the nodes 137, 138, 151, 152 is well known to persons of ordinary skill in the art and in the interest of clarity the functionality of these entities will be not discussed in detail herein.

Figure 2:
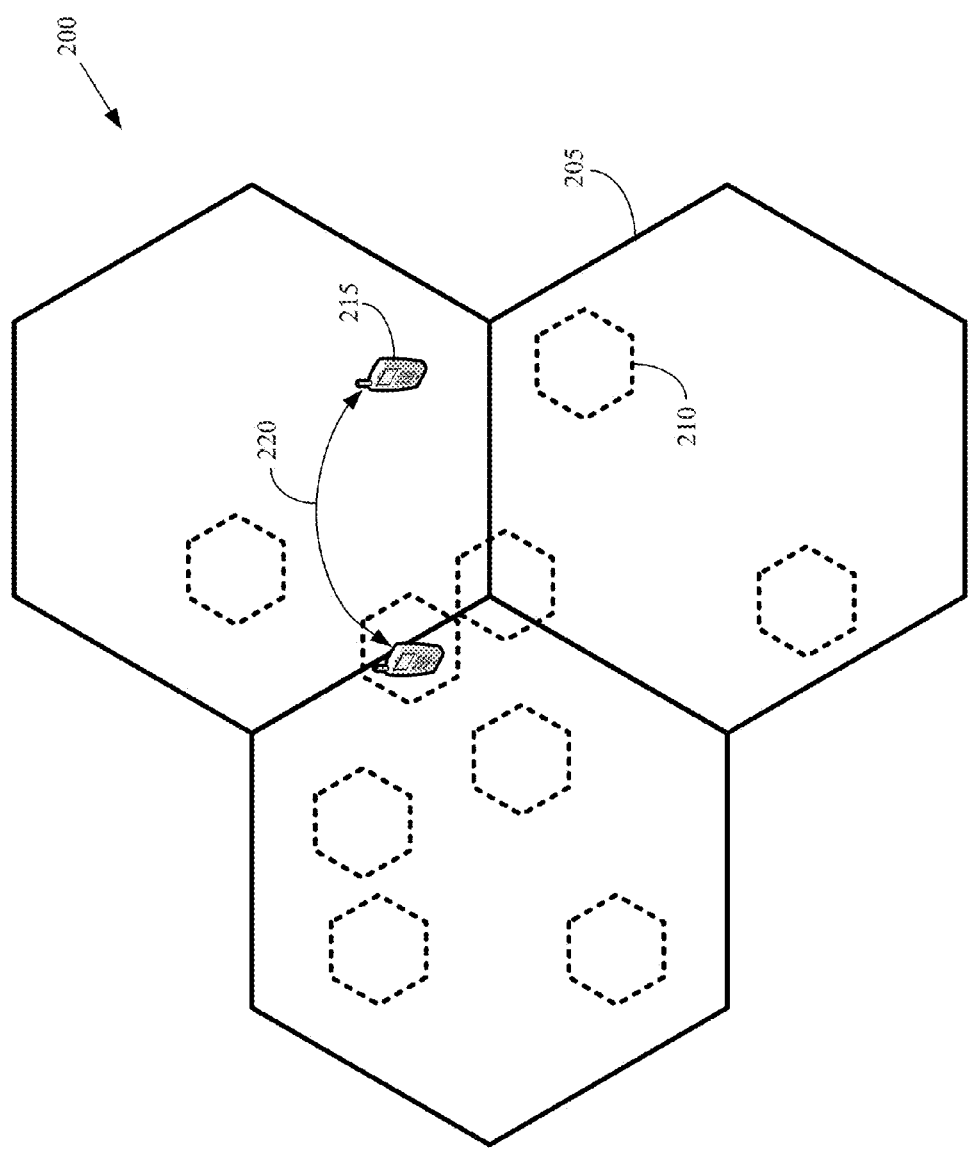
FIG. 2 conceptually illustrates a second exemplary embodiment of a wireless communication system.

FIG. 2 conceptually illustrates a second exemplary embodiment of a wireless communication system 200. In the illustrated embodiment, the wireless communication system 200 includes a network of macrocells 205 (only one indicated by an identifying numeral) and an overlay network of hotspots or small cells 210 (only one indicated by an identifying numeral). Wireless-enabled devices such as mobile units or other access terminals 215 may access the wireless communication system 200 using either the macrocells 205 or the small cells 210. The access terminals 215 may also switch their association between the macrocells 205 and the small cells 210, as indicated by the double-headed arrow 220. For example, the access terminal 215 may switch associations from a macrocell 205 to a small cell 210 or vice versa. Idle access terminals 215 may perform a cell reselection based on parameters stored in the access terminal 215. Active access terminals 215 that have established traffic channels over the air interface may perform a handoff of the traffic channels based upon handoff parameters that may be stored in one or more macrocells 205, small cells 210, and/or in the access terminal 215.

In the idle mode, cell reselections are performed autonomously by the access terminal 215 based on measurements performed by the access terminal 215. The decision to perform a cell reselection may be controlled by cell reselection parameters that are broadcast by the network 200. In one embodiment, different priorities can be assigned to different frequency layers and/or different carriers. One exemplary cell selection criterion compares the received signal strengths of source and target cells (Q, S):

$$S\_rxlevel > Q\_rxlevelmeas + hysteresis$$

For example, the strength Q_rxlevelmeas may be a measurement of the reference signal received power (RSRP) from the current serving cell. The thresholds, offset values, hysteresis values, and/or time-to-trigger (TTT) values determined by reselection timers for the RSRP measurements may be selected to minimize ping-pongs. Additional cell reselection parameters maybe set to prevent ping pongs for high mobility access terminals 215. Also, some standards and/or protocols for wireless communication defined the cell reselection criterion by requiring that "the reselection occurs to the best ranked neighbor cell if it is better than the serving cell for a longer period than T_reselection". This criterion may be used to prevent reselection due to temporary fading.

Ping-ponging may occur when an access terminal 215 is quickly reattached to a small cell 210 after attaching to a macrocell 205 after the access terminal moves away from the small cell 210 into a nearby macrocell coverage area. Alternatively, ping-ponging may also occur when the access terminal 215 attaches to a macrocell 205 after being handed off or reselecting a small cell 210. In other cases, ping-ponging may involve numerous handoffs or cell reselections between macrocells 205 and small cells 210. The access terminal 215 may transmit a routing area update or location area update in response to each handoff and/or cell reselection. For example, the access terminal 215 may transmit a routing area update or a location area update when it moves between macrocells 205 and small cells 210 that do not use the same location area code or routing area code. The routing area update or location area update trigger may therefore result in increased signaling in the core network, e.g., with gateway serving nodes (SGSN, GGSN) and/or mobile switching centers (MSC). Ping-ponging may therefore consume valuable air interface resources. To reduce the incidence of ping-ponging and conserve air interface resources, the cell reselection parameters and/or handover parameters may be dynamically modified based on the behavior of the access terminal 215 using embodiments of the techniques described herein.

Figure 3:
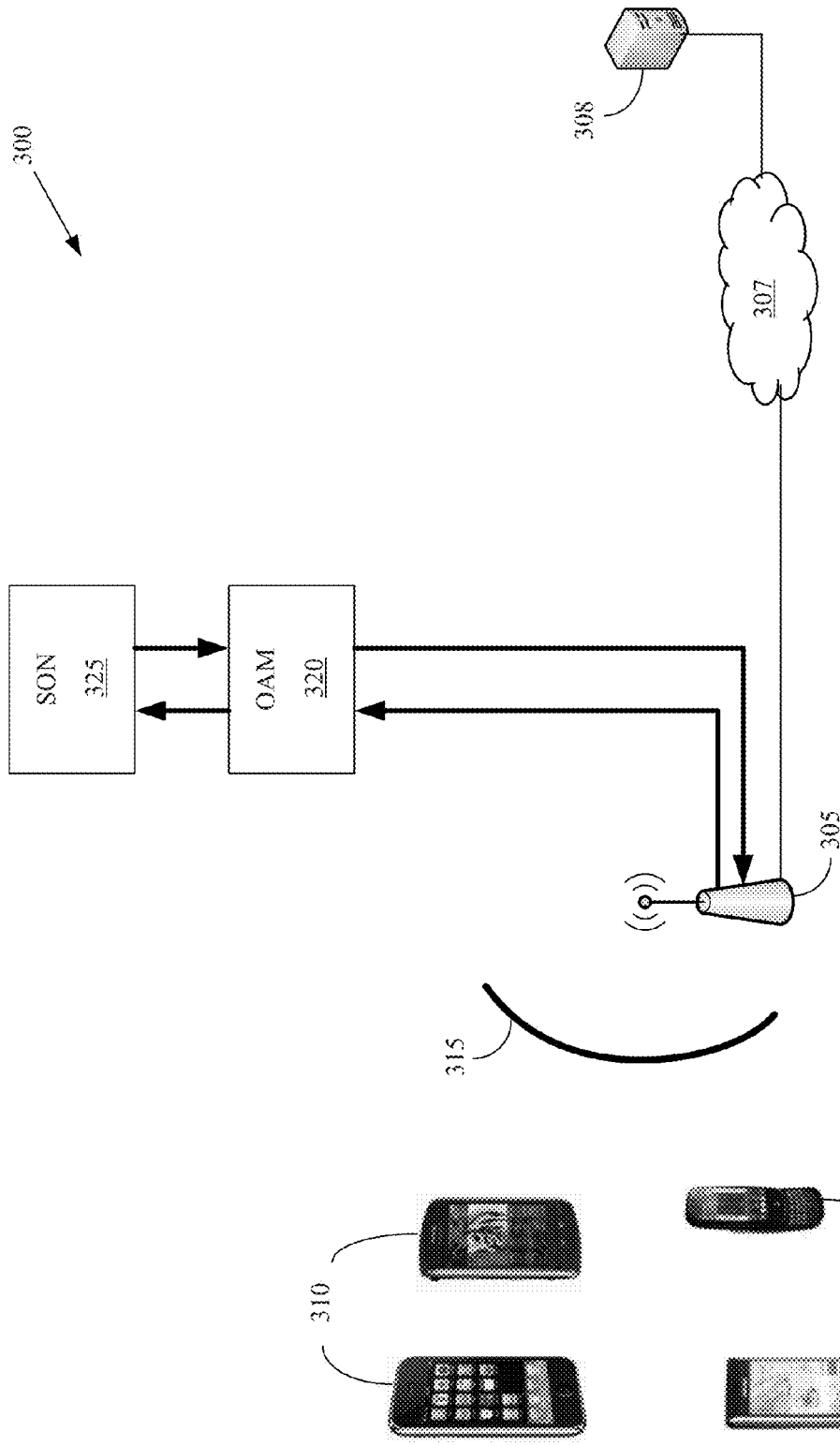
FIG. 3 conceptually illustrates a third exemplary embodiment of a wireless communication system.

FIG. 3 conceptually illustrates a third exemplary embodiment of a wireless communication system 300. In the illustrated embodiment, the wireless communication system 300 includes a wireless network access device 305 that provides wireless connectivity to one or more user equipment such as the access terminals 310 over an air interface 315. The wireless network access device 305 may be a macrocellular device such as a base station, a base transceiver station, a base station router, or an access point that provides coverage to a macrocell. Alternatively, the wireless network access device 305 may be a microcellular (small cell) device such as a femtocell, metro cell, pico cell, and the like that provides coverage to a microcell. In the illustrated embodiment, the wireless network access device 305 may be communicatively connected to a core network 307, which may be communicatively coupled to one or more servers such as a policy and charging and rules function (PCRF) server 308.

The access terminals 310 and/or wireless network access devices 305 can perform various measurements based on signals transmitted over the air interface 315. In one embodiment, the wireless network access devices 305 can count the number of handovers of each access terminal 310 to and/or from the wireless network access device 305 and, in particular, the wireless network access devices 305 can count the number of cell reselections or handovers of the access terminals 310 between the wireless network access device 305 and access devices implemented in other overlaying networks. For example, the wireless network access devices 305 can count the number of cell reselections performed by idle access terminals 310 between the wireless network access device 305 and other overlaying networks of small cells. For another example, the wireless network access devices 305 can count the number of handovers performed by active access terminals 310 between the wireless network access device 305 and small cells in the overlaying networks.

The values of the cell reselection and/or handover counters (or other information derived from the counter values such as averages, rates, exponentially weighted moving averages, and the like) can be fed back to other entities in the wireless communication system 300. In the illustrated embodiment, the wireless network access devices 305 may be configured to feed back the information indicative of the counter values to the system 300 in response to the counter values (or values derived therefrom) exceeding threshold values. For example, if the number of cell reselections performed by an idle access terminal 310 within a particular time interval exceeds a selected threshold value, the wireless network access devices 305 may transmit a notification to the system 300. The notification may include information indicating the cell reselection counter value (or values derived therefrom) as well as other information such as an access terminal identifier, information indicating that the access terminal 310 is in the idle state, and the like.

In the illustrated embodiment, the feedback is provided to an OAM server 320, which may store the provided information in a database. The OAM server 320 may also use the feedback to generate a request for new cell reselection parameters and/or handover parameters. The request may then be sent to another server such as a self-organizing network (SON) server 325, which may be configured to generate the new cell reselection parameters and/or handover parameters. Although the server 320, 325 are depicted as separate entities in the system 300, persons of ordinary skill in the art having benefit of the present disclosure should appreciate that alternative embodiments may implement the server 320, 325 and a single entity or may distribute the server functionality among a larger number of physical devices. In various embodiments, the cell reselection and/or handover parameters may include signal strength thresholds, biases, hysteresis values, time-to-trigger values, channel quality information, channel state information, mobility information, and the like. Cell reselection and/or handover parameters may also include values of the thresholds used to determine when to update and/or modify the cell reselection and/or handover parameters.

The SON server 325 can generate and/or modify the cell reselection and/or handover parameters in response to receiving the request from the OAM server 320. In one embodiment, the parameters are determined to reduce ping-ponging between macrocells and small cells, e.g., by reducing the number of cell reselections and/or handovers that occur during a particular time interval. For example, thresholds and/or time-to-trigger values may be increased to reduce the number of cell reselections and/or handovers. For another example, bias values associated with different small cells can be modified to increase or decrease the probability that a cell reselection or handover is performed from a macrocell to a small cell or vice versa. The SON server 325 can then store the generated values of the parameters and transmit information indicating the generated values to the OAM server 320, which may then forward these values to the wireless network access device 305 for storage and/or transmission to the access terminal 310. For example, cell reselection parameters should be transmitted to the access terminal 310 because cell reselections are performed autonomously by the access terminal 310 when it is in the idle mode.

Figure 4:
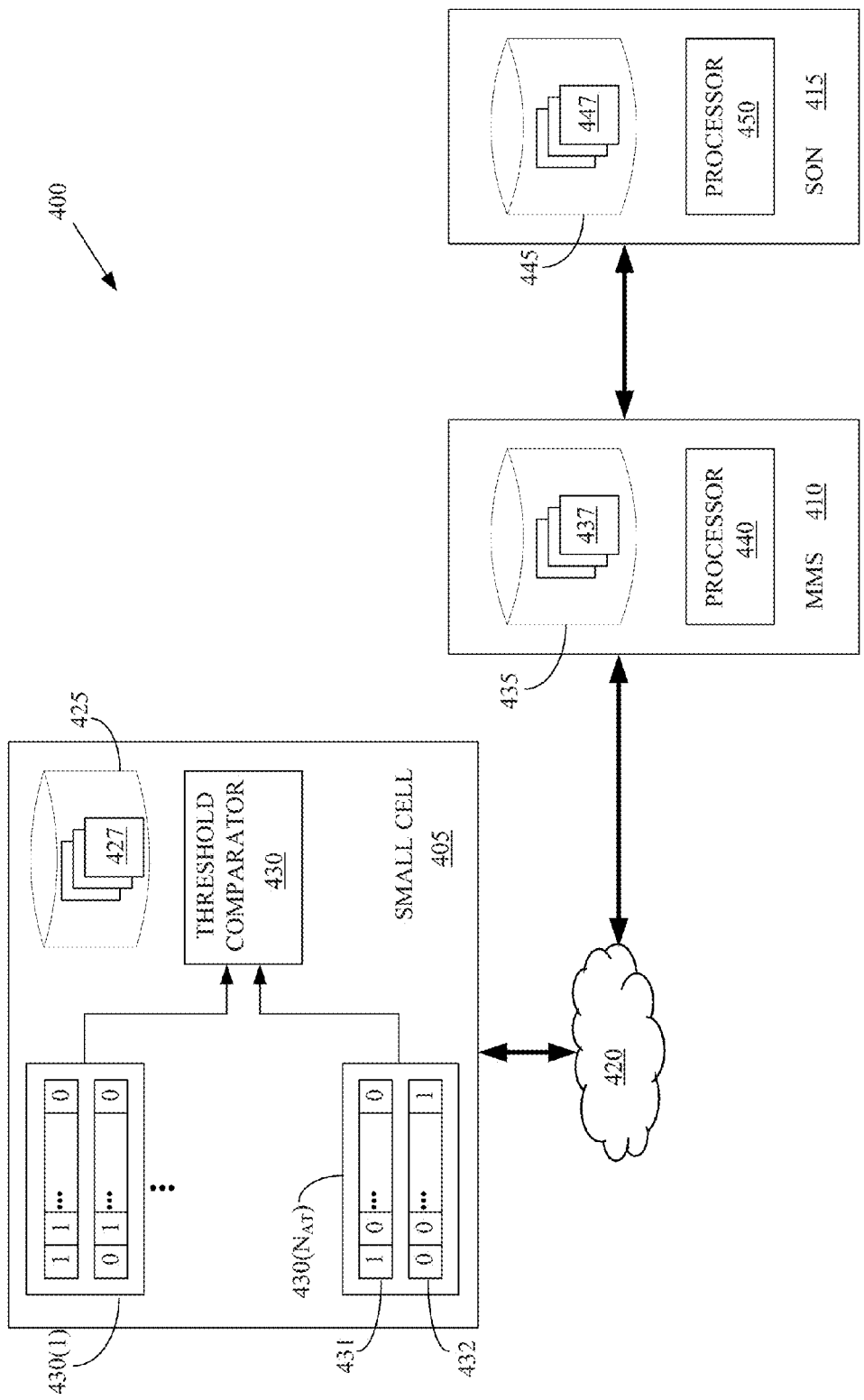
FIG. 4 conceptually illustrates a fourth exemplary embodiment of a wireless communication system.

FIG. 4 conceptually illustrates a fourth exemplary embodiment of a wireless communication system 400. In the illustrated embodiment, the wireless communication system 400 includes one or more small cells 405 that are communicatively coupled to a motive management server (MMS) 410 and a SON server 415 via a network 420. The small cell 405 includes a database 425 that can be used to store information associated with access terminals that are camping on the small cell 405, have an active communication connection with the small cell 405, or were previously camping on or communicating with the small cell 405, e.g., before performing a cell reselection or handing off to a macrocell. For example, the database 425 may be a data structure formed in a memory element and used to store a management information base (MIB) 427 for each access terminal Persons of ordinary skill in the art should appreciate that a MIB is a formal description of a set of network objects that can be managed using a management protocol such as TR69, Simple Network Management Protocol (SNMP), and the like. The format of the MIB 427 may be defined as part of a data model according to the TR69/SNMP protocols. Other MIBs may be defined as extensions of this basic management information base. For example, MIB-I refers to the initial MIB definition and MIB-II refers to the current definition. The SNMPv2 protocol includes MIB-II and adds some new objects. In the illustrated embodiment, MIBs 427 can be created for the idle and/or active access terminals associated with the small cell 405. For example, a MIB 427 may be created into the data model of TR-069 for HNBs. For another example, an equivalent set of MIBs 427 may be created for metro cells.

The small cell 405 also includes sets of counters 430 for counting cell reselections by idle access terminals and/or handovers by active access terminals. In the illustrated embodiment, the small cell 405 maintains $N_{AT}$ sets of counters 430 for a corresponding number $N_{AT}$ of access terminals. Each of the sets of counters 430 includes an idle mode counter 431 and an active mode counter 432 so that the numbers of cell reselections and/or handovers performed by an access terminal in different modes can be counted independently. However, persons of ordinary skill in the art having benefit of the present disclosure should appreciate that this particular configuration of counters 430, 431, 432 is intended to be illustrative. Alternative embodiments of the small cell 405 may use different sets of counters. For example, the small cell 405 may maintain separate counters to count cell reselections for each idle access terminal and a single counter to count all active mode handoffs.

A threshold comparator 435 is communicatively coupled to the counters 430, 431, 432. In the illustrated embodiment, the threshold comparator 435 monitors the values in the counters 430, 431, 432 and compares these values to corresponding threshold values. The threshold comparator 435 may then generate signals and/or messages when values in one or more of the counters 430, 431, 432 exceed their corresponding threshold value. For example, the threshold comparator 435 may generate a request for modified cell reselection parameters when values in one or more of the counters 431 exceed their corresponding threshold value for a selected time interval. For another example, the threshold comparator 430 may generate a request for modified handover parameters when values and one or more of the counters 432 exceed their corresponding threshold values for a selected time interval. Alternatively, the threshold comparator 435 may be configured to form functional and/or statistical combinations of counter values and then compare the derived values to corresponding thresholds. Exemplary functional and/or statistical combinations include window functions, exponentially weighted moving averages, averages, sums, and the like.

In one embodiment, the threshold values used by the threshold comparator 435 may implement triggers in software that are executed when an MIB condition is met. For example, the software trigger may occur when the value of a counter 430, 431, 432 exceeds the corresponding threshold. The MIB conditions may be stored in the MIBs 427. The small cell 405 may then autonomously send a message over the network 420 to the MMS 410. For example, the small cell 405 may use TR-069 procedures to send a message to a TR-69 management system via a Femto Gateway for the small cell 405 may send an SNMP message to an Element Management System (SAM). In various embodiments, the message may include information such as whether the ping pong occurred when the access terminal was in the idle mode or the active mode. The message may also include other information that may be relevant to establishing handoff parameters for active access terminals, such as channel quality information, channel state information, mobility information, and the like.

The MMS 410 implements a database 435 and a processor 440. The illustrated embodiment of the database 435 may be a data structure formed in a memory element and used to store MIBs 437 and other information associated with access terminals camped on or in communication with the small cell 405 and/or any other small cells associated with the MMS 410. The MMS 410 can also support an interface to the SON server 415. For example, the MMS 410 may implement a TR-69 Management System or a 5620 SAM interface to the SON server 415. In the illustrated embodiment, the processor 440 in the MMS 410 performs passive monitoring. For example, the processor 440 may peg counters and/or keep statistics of the number of ping-pongs over a period of time. The processor 440 in the MMS 410 may also generate requests for modified or updated cell reselection and/or handover parameters, provide these requests to the SON server 415, and then forward the cell reselection and/or handover parameters to the small cell 405. For example the MMS 410 may generate the requests in response to the threshold comparator 430 determining that one or more thresholds have been crossed.

The SON server 415 includes a database 445 and a processor 450. The illustrated embodiment of the database 445 may be a data structure formed in a memory element and used to store MIBs 447 and other information associated with access terminals camped on or in communication with the small cell 405 and/or any other small cells associated with the MMS 410 and/or the SON server 415. The processor 450 is configured to determine values of the various mobility and idle mode parameters used for cell reselection and/or handover. For idle mode mobility, the processor 450 uses information received from the MMS 410 and/or information stored in the database 445 to update, generate, and/or modify the cell reselection parameters used to determine whether to perform cell reselection of the idle access terminal between macrocells and the small cell 405. For active mode handovers between small cells and macrocells that are on the same carrier and/or frequency, the processor 450 uses information received from the MMS 410 and/or information stored in the database 445 to update, generate, and/or modify the handover parameter settings. In some embodiments, the processor 450 may also use information indicating radio conditions, access terminal mobility, and the like to create the handover parameter settings. The small cell 405 and/or MMS 410 may provide the additional information to the SON server 415 as part of the request for the new handover parameter settings so that the SON server 415 can incorporate this information into the determination of the handover parameter settings. For example, the SON server 415 can process the request and execute algorithms that compute, in near-real-time, optimal values of the idle mode mobility parameters (cell selection/reselection) or active mode and over parameters. The SON server 415 may then transmit the new parameters, e.g., to the TR-69 management system which can pass it to the HNB utilizing TR-069 procedures or to the EMS for the Metro cells. As a result of new and updated idle mode mobility parameters being available at the HNB/Metro, ping pongs should reduce.

Figure 5:
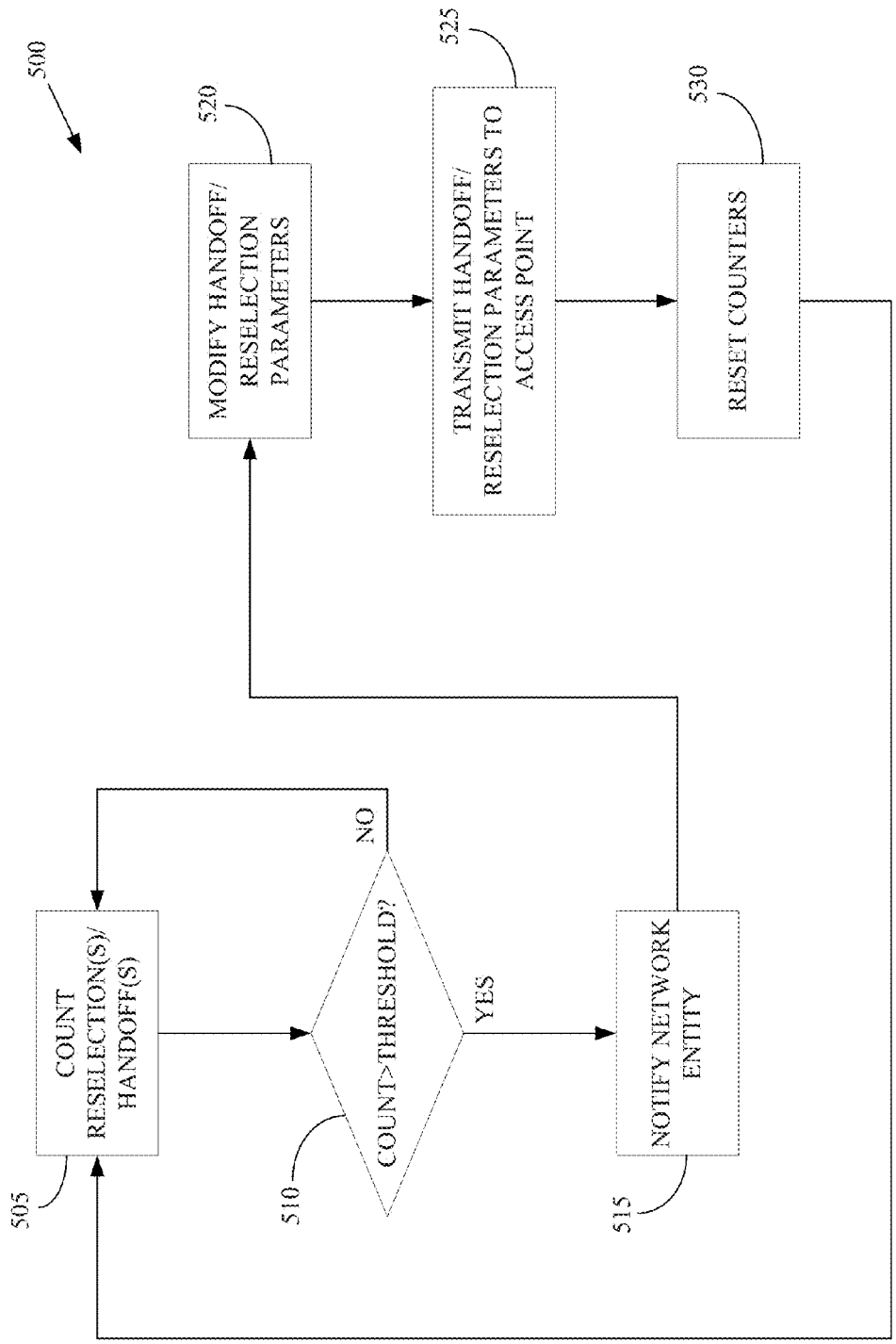
FIG. 5 conceptually illustrates one exemplary embodiment of a method for determining handoff and/or cell reselection parameters.

FIG. 5 conceptually illustrates one exemplary embodiment of a method 500 for determining handoff and/or cell reselection parameters. In the illustrated embodiment, the method 500 may be implemented in a small cell, a macrocell, or other device that is used to provide wireless connectivity to a geographical area that overlies and/or overlaps a macrocellular network. Numbers of cell reselection and/or handovers may be counted (at 505) using one or more counters implemented in the small cell or other device. For example, a small cell may include counters for counting idle mode cell reselections and active mode handovers for access terminals associated with the small cell. As long as the values of the counters do not exceed (at 510) one or more thresholds, the numbers of cell reselections and/or handovers may continue to be counted (at 505). When the value of one or more of the counters exceeds (at 510) a corresponding threshold, the small cell or other device can notify (at 515) an entity in the network such as an OAM server. The notification indicates that the reselection/handover counter has exceeded its threshold and requests modified reselection or handover parameters.

A server in the network, such as a SON server, may then modify (at 520) cell reselection and/or handover parameters in response to the request generated by the small cell or other device. The cell reselection and/or handover parameters can be modified (at 520) to reduce ping-ponging between the macrocellular system and the overlaying small cell system. The cell reselection and/or handover parameters can then be transmitted (at 525) to the small cell or other device. For example, the SON server can transmit the parameters to the OAM server, which can then forward the parameters to the small cell or other device. In the illustrated embodiment, counters associated with the updated and/or modified cell reselection and/or handover parameters may be reset (at 530)

in response to receiving the new parameters. For example, if the small cell receives updated cell reselection parameters for a particular idle access terminal, the counter used to count cell reselections for this access terminal may be reset.

Embodiments of the techniques described herein may have a number of advantages over the conventional practice of using handover parameters and/or cell reselection parameters that are only loaded during initialization and are not subsequently updated or modified. For example, dynamically modifying cell reselection and/or handover parameters in response to varying circumstances using embodiments of the techniques described herein may reduce ping-pongs between overlaying networks such as HNBs/Metro cells and Macro cells. Consequently, embodiments of these techniques may significantly reduce signaling within the core network on interfaces such as the Iu-CS interface and/or the Iu-PS interface. Furthermore, deployment of HNBs/Metro cells is expected to be widespread and embodiments of the techniques described herein may be used to allow the network to respond to frequent and unannounced changes in the network topology in a proactive manner. Embodiments of these techniques may also significantly reduce signaling within the core network due to idle mode cell reselection that may occur when user equipment moves out of or into its HNB/Metro coverage to/from a Macro coverage area.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   determining, at a small cell, at least one of a number of cell reselections for idle access terminals and a number of handovers for active access terminals,
   providing, from the small cell, a request for at least one cell reselection parameter or handover parameter in response to the at least one of the number of cell reselections or the number of handovers between the small cell and at least one macrocell exceeding at least one threshold; and
   storing said at least one cell reselection parameter or handover parameter in the small cell.

2. The method of claim 1, comprising comparing the number of cell reselections or the number of handovers to said at least one threshold.

3. The method of claim 2, wherein counting the number of cell reselections or the number of handovers comprises counting the number of cell reselections using at least one counter allocated for idle access terminals and counting the number of handovers using at least one counter allocated for active access terminals.

4. The method of claim 1, comprising receiving, at the small cell, information indicating said at least one cell reselection parameter or handover parameter in response to providing the request.

5. The method of claim 4, comprising providing said information indicating said at least one cell reselection parameter to at least one access terminal, wherein said information is usable for reconfiguring said at least one access terminal.

6. A method, comprising:
   receiving, at a first server from a small cell, a first request for at least one cell reselection parameter or handover parameter in response to the small cell determining that at least one of a number of cell reselections by at least one idle access terminal exceeds at least one cell reselection threshold or a number of handovers between the small cell and at least one macrocell by at least one active access terminal exceeds at least one handover threshold; and
   providing, from the first server, said at least one cell reselection parameter or handover parameter to the small cell.

7. The method of claim 6, wherein providing said at least one cell reselection parameter or handover parameter comprises providing a second request to a second server in response to receiving the first request, receiving said at least one cell reselection parameter or handover parameter generated by the second server in response to the second request, and providing said at least one cell reselection parameter or handover parameter generated by the second server to the small cell.

8. The method of claim 6, comprising storing information received in the first request in a database and generating statistical representations of cell reselections or handovers based on information stored in the database.

9. The method of claim 6, comprising generating said at least one cell reselection parameter or handover parameter based on information received from the small cell in the first request.

10. A method, comprising:
receiving, at a second server from a first server, a request for at least one cell reselection parameter or handover parameter in response to a small cell determining that at least one of a number of cell reselections by at least one idle access terminal exceeds at least one cell reselection threshold or a number of handovers between the small cell and at least one macrocell by at least one active access terminal exceeds at least one handover threshold; and
providing, from the second server to the first server, said at least one cell reselection parameter or handover parameter for transmission from the first server to the small cell.

11. The method of claim 10, comprising generating said at least one cell reselection parameter or handover parameter based on information received from the small cell in the first request.

12. The method of claim 11, wherein generating said at least one cell reselection parameter comprises modifying at least one cell reselection parameter used by at least one access terminal when in an idle mode in response to at least one counter associated with said at least one access terminal exceeding the at least one cell reselection threshold.

13. The method of claim 11, wherein generating said at least one handover parameter comprises modifying at least one handover parameter used by the small cell in response to at least one counter associated with active access terminals exceeding the at least one handover threshold.

14. A small cell, comprising:
at least one counter for counting at least one of a number of cell reselections or a number of handovers between the small cell and at least one macrocell, wherein said at least one counter comprises a plurality of counters for counting cell reselections of idle access terminals and handovers of active access terminals; and
a comparator for determining whether said at least one of the number of cell reselections or the number of handovers exceeds at least one threshold.

15. The small cell of claim 14, wherein said at least one threshold comprises a plurality of thresholds associated with idle access terminals or active access terminals, and wherein the comparator is configured to determine whether at least one value of at least one of the plurality of counters exceeds a corresponding one of the plurality of thresholds.

16. The small cell of claim 14, wherein the small cell is configured to provide a request for at least one of a cell reselection parameter or a handover parameter in response to the comparator determining that said at least one of the number of cell reselections or the number of handovers exceeds said at least one threshold.

17. The small cell of claim 16, wherein the small cell is configured to provide said at least one requested cell reselection parameter to at least one access terminal.

18. The small cell of claim 16, wherein the small cell is configured to determine whether to request handover of at least one access terminal based on said at least one requested handover parameter.

19. The small cell of claim 16, comprising a database for storing cell reselection parameters and handover parameters.

20. A management server, comprising:
a database for storing information indicating at least one of a number of cell reselections or a number of handovers between a small cell and at least one macrocell, wherein said information is received from the small cell in response to said at least one of the number of cell reselections by at least one idle access terminal exceeding at least one cell reselection threshold or the number of handovers between the small cell and at least one macrocell by at least one active access terminal exceeding at least one handover threshold; and
a processing element configured to generate a request to modify at least one cell reselection parameter or handover parameter used by the small cell, wherein said request is generated based on said information stored in the database.

21. The management server of claim 20, wherein the processing element is configured to generate the request in response to receiving a notification from the small cell in response to said at least one of the number of cell reselections by the at least one idle access terminal exceeding at least one cell reselection threshold or the number of handovers by the at least one active access terminal exceeding said at least one handover threshold.

22. The management server of claim 20, wherein the management server is configured to receive at least one modified cell reselection parameter or modified handover parameter in response to the request.

23. The management server of claim 22, wherein the management server is configured to provide said at least one modified cell reselection parameter or modified handover parameter to the small cell.

24. The management server of claim 20, wherein the management server is configured to function as a self-organizing network (SON) management server.

25. A network server, comprising:
a processing element configured to generate at least one cell reselection parameter or handover parameter in response to a small cell determining that at least one of a number of cell reselections by at least one idle access terminal exceeds at least one cell reselection threshold or a number of handovers between the small cell and at least one macrocell by at least one active access terminal exceeds at least one handover threshold.

26. The network server of claim 25, wherein the network server is configured to receive a request to generate said at least one cell reselection parameter or handover parameter from at least one of the small cell or another server.

27. The network server of claim 26, wherein the network server is configured to provide said at least one cell reselection parameter or handover parameter to said at least one of the small cell or another server.

28. The network server of claim 26, wherein the processing element is configured to generate said at least one cell reselection parameter or handover parameter based on information received from the small cell in the request.

29. The network server of claim 28, wherein the processing element is configured to generate said at least one cell reselection parameter used by at least one access terminal when in an idle mode in response to at least one counter associated with said at least one access terminal exceeding the at least one cell reselection threshold.

30. The network server of claim 28, wherein the processing element is configured to generate said at least one handover parameter used by the small cell in response to at least one counter associated with active access terminals exceeding the at least one handover threshold.

31. The network server of claim 25, wherein the network server is configured to function as a self-organizing network (SON) server.

\* \* \* \* \*